United States Patent [19]

Stolz et al.

[11] Patent Number: 4,653,156

[45] Date of Patent: Mar. 31, 1987

[54] CONVECTOR FOR CONVEYOR BELTING

[75] Inventors: Hermann Stolz, Mühlheim/Main; Wolfgang Herold, Offenbach am Main, both of Fed. Rep. of Germany

[73] Assignee: MATO Maschinen- und Metallwarenfabrik Curt Matthaei GmbH & Co Kg, Offenbach, Fed. Rep. of Germany

[21] Appl. No.: 803,499

[22] Filed: Dec. 2, 1985

[30] Foreign Application Priority Data

Dec. 20, 1984 [DE] Fed. Rep. of Germany ....... 3446427

[51] Int. Cl.4 ............................................... F16G 3/02
[52] U.S. Cl. ................................... 24/33 R; 24/31 B; 24/31 H; 24/37; 474/257
[58] Field of Search ............... 24/33 R, 33 L, 31 R, 24/31 B, 31 F, 31 L, 31 H, 37; 474/257

[56] References Cited

U.S. PATENT DOCUMENTS

| 9,080 | 6/1852 | Smith | 24/37 |
|---|---|---|---|
| 1,918,257 | 7/1933 | Forsyth | 24/37 |
| 2,330,434 | 9/1943 | Lazzell | 24/37 |
| 2,446,311 | 8/1948 | Traxler | 474/257 |
| 3,093,005 | 6/1963 | Dean | 24/31 B |
| 3,327,359 | 6/1967 | Wiese | 24/37 |
| 3,501,971 | 3/1970 | Peterson | 24/31 B |
| 4,315,349 | 2/1982 | Stolz | 24/31 H |
| 4,540,389 | 9/1985 | Ramsey | 24/37 |

FOREIGN PATENT DOCUMENTS

| 1740374 | 3/1957 | Fed. Rep. of Germany . | |
|---|---|---|---|
| 18146 | of 1911 | United Kingdom | 24/37 |

Primary Examiner—Victor N. Sakran
Attorney, Agent, or Firm—W. G. Fasse; D. H. Kane, Jr.

[57] ABSTRACT

A fastener for conveyor belting has a plurality of fastener elements forming a strip adapted to join the ends of the of conveyor belting with the aid of a coupling rod. Each strips forms one half of the fastener and its parallel connecting elements have legs and eye lugs for the purpose of forming eyes to receive and encompass a coupling rod after the legs of the two halves have been secured to the two belt ends and after the two belt halves have been brought into alternate interlocking engagement. The elements are secured to the ends of the belting by using pin-like fastening means such as staples. A non-leaking connection and a grease lubrication of the coupling rod are provided by a caulking filler in the form of a molded body of a rubber elastic material with eye lug grooves and fin elements which are aligned with the respective eye lugs of the connecting strip as an extension thereof and the molded body encompasses the coupling rod at least in part.

11 Claims, 8 Drawing Figures

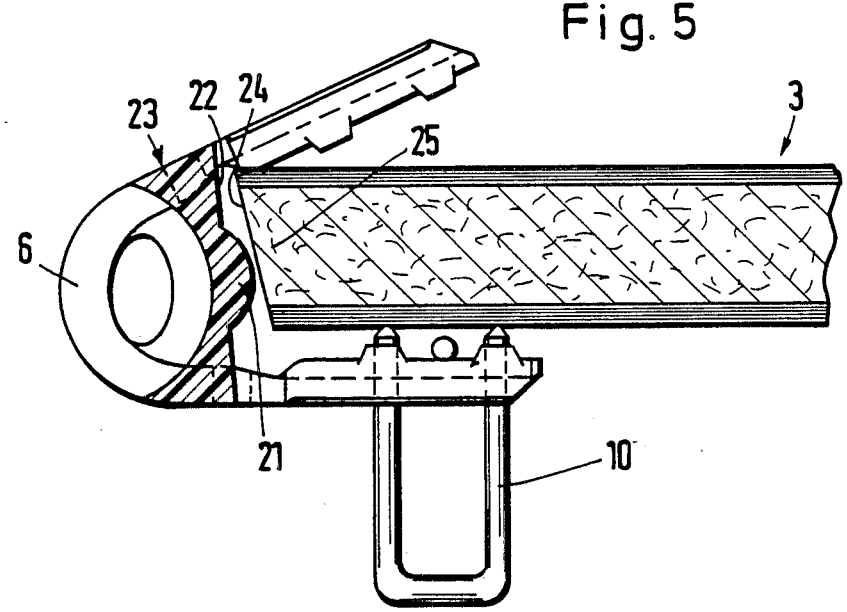
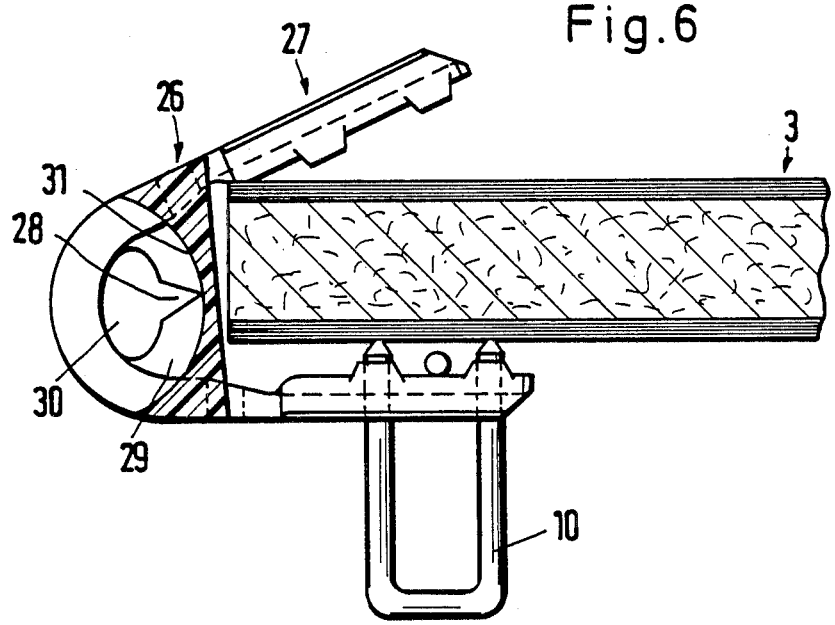

CONVECTOR FOR CONVEYOR BELTING

FIELD OF THE INVENTION

The invention relates to connecting fasteners for conveyor belting and more particularly but not exclusively to such a fastener in the form of two strips adapted to join the ends of lengths of conveyor belting with the aid of a coupling rod. These fasteners include an array of parallel connecting elements which have legs and eye lugs for the purpose of forming eyes to receive and encompass the coupling rod. The legs are to be secured to the ends of the belting by using pin-like fastening means, such as staples.

DESCRIPTION OF THE PRIOR ART

Conveyor belt fasteners of this type have long been known and used in the art. The eye lugs and the legs are fitted around the end of the respective piece of belting fo form aligned eyes into which the coupling rod may then be inserted after the eyes on the two belt ends have been caused to overlap in a single row. The coupling rod constitutes a journal element that is also easy to release between the ends of the lengths of belting.

Between the coupling rod and the end faces of the two belt ends there are gaps through which material may trickle especially when the belt is used for transporting particulate material. Furthermore, the coupling rod and the eyes are completely uncovered over the full width of the belt and so are likely to be exposed to the respective environmental influences including the material being transported on the belt.

In order to somewhat reduce the trickling of the material through the mentioned gaps of the fastener there have been proposals to caulk the gaps between the legs with rubber strip or thread so that such rubber therefore fills up the space otherwise left between the coupling rod and the end faces of the belting. However, even so, there is still a large number of small passages adjacent to the eyes so that it is nonetheless possible for material on the belt to trickle through these passages and, for instance, to cause trouble by fouling the rollers supporting the conveyor belt.

German Utility Model No. 1,740,374 discloses placing pieces of sponge rubber between the legs of the connecting elements. These pieces of sponge rubber are highly flexible and soft so that they fill up the cavities and gaps after the connecting elements have been pressed into place. This type of filler has, however, not become widely accepted in practice because rubber sponge or other sorts of rubber with the same sort of elasticity has generally an insufficient strength for taking up the mechanical loads or stress encountered in such connectors. Hence, these sponge rubber elements rapidly become ineffective.

A further problem, in connection with belt fasteners of the sort in question, is that the eyes and the coupling rod are subject to high stresses and are directly exposed to the material on the conveyor belt so that such material is able to work its way in between the eyes and the coupling rod, thereby impairing their function as connecting means which must permit the relative motion between the parts in operation.

Furthermore there is no lubrication between the coupling rod and the eyes.

OBJECTS OF THE INVENTION

Therefore, it is one object of the present invention to provide means by which trickling of the conveyed material through the belt connector may be prevented.

Another object is to prevent fouling of the coupling rod and eyes, and to make lubrication of the coupling rod with grease possible.

SUMMARY OF THE INVENTION

In order to attain these objects or further objects appearing in the course of the present specification, the present filler has the form of a molded body with eye lug grooves and fin elements between neighboring grooves for the eye lugs, said fins being located in the plane of the eye lugs of the respective connecting element, said fins encompassing at least partially a coupling rod interconnecting two fastener strips.

The fin elements and the eyes grooves form pockets, in which the outer parts of the eyes of the conveyor belt fastener strips of the other respective belt end rest in the assembled condition. The molded body therefore fits lockingly around the eyes and at the same time occupies all of the space between the coupling rod and the adjacent the belt end. Furthermore, the molded body in each fastener strip extends between the eye lugs as far as the coupling rod and therefore substantially prevents that the outer face of the coupling rod comes into contact with the material being conveyed.

Furthermore it is best for the eye lug grooves to be filled with grease, that is only partially pressed out when the eye lugs are moved into place and then later becomes distributed all along the coupling rod. This grease not only lubricates all metal parts moving in relation to each other but furthermore prevents dirt particles working their way inbetween the eye lugs.

BRIEF DESCRIPTION OF THE DRAWINGS

The invention will now be described in the form of some working examples with reference to the drawings, wherein:

FIG. 5 is a section similar to that of FIG. 1 but showing a modified form of the invention.

FIG. 6 is a section similar to that of FIGS. 1 and 5 to illustrate a third embodiment of the invention;

Figure 1:
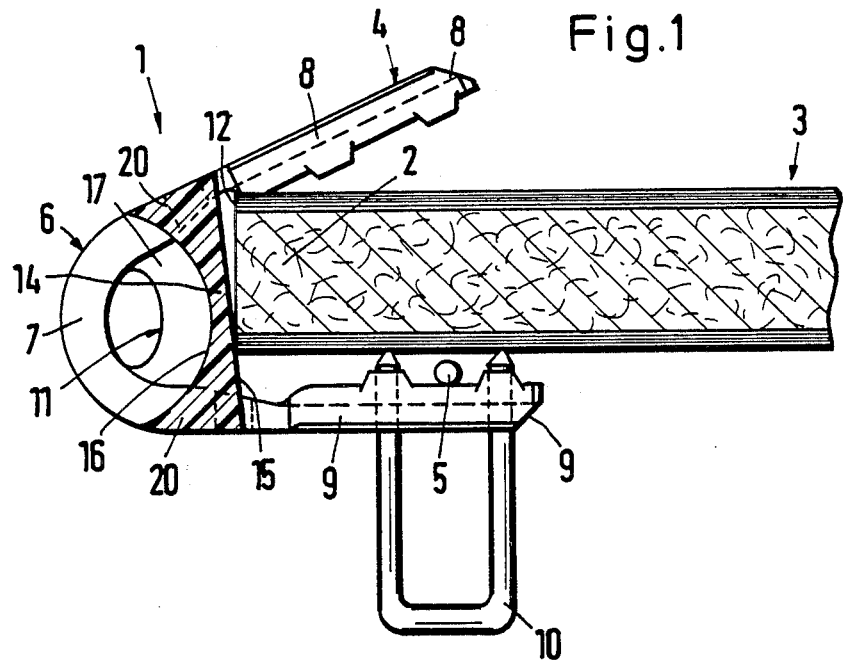
FIG. 1 is a section taken through a conveyor belt fastener in the form of a connecting strip before pressing the securing staples of the strip into the end of a piece of conveyor belt.

DETAILED DESCRIPTION OF PREFERRED EXAMPLE EMBODIMENTS AND OF THE BEST MODE OF THE INVENTION

The conveyor belt fastener 1 in the form of a connection strip for joining the ends 2 of a conveyor belt 3 comprises a plurality of connecting elements 4 joined in a parallel array or strip, for example by means of a soldered-on wire 5 extending perpendicularly thereto. Each connecting element 4 has a eye lug 7 forming an eye 6, to receive a coupling rod not shown in the figures, and upper and lower legs or limbs 8 and 9, respectiely. The legs 8, 9 fit around the end of the belting in the form of a U-shape in the mounted condition and they are secured in such mounted or assembled condition by means of staple-like securing means 10 (see FIG. 2).

Figure 2:
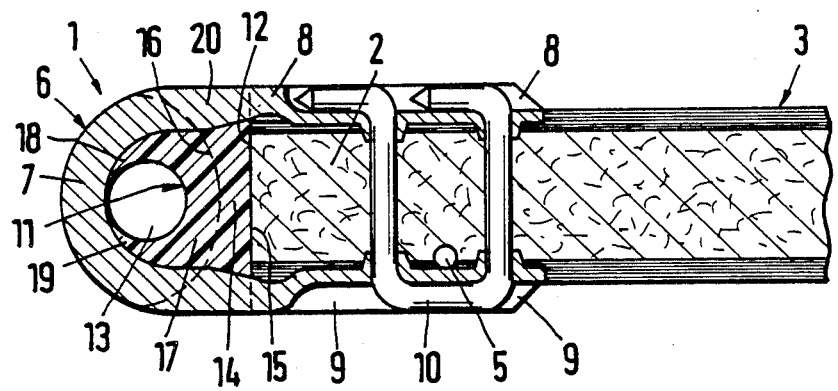
FIG. 2 is a section similar to that of FIG. 1 but but passing through the eye lug, and after pressing the staples into the end of the belt.
Figure 3:
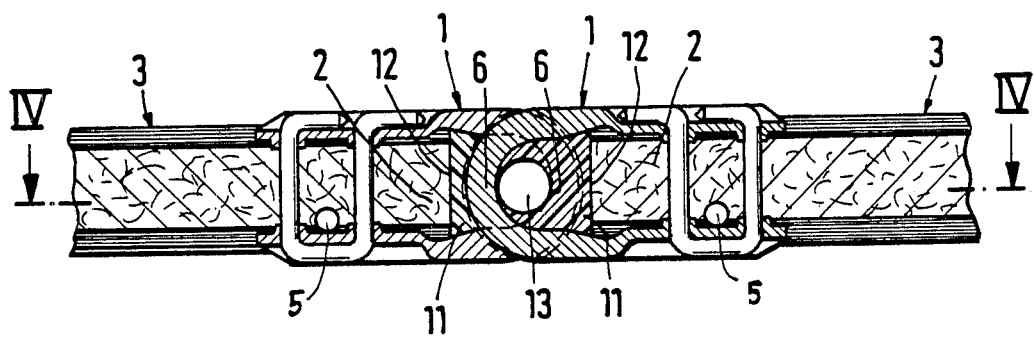
FIG. 3 is a section taken through coupled lengths of conveyor belting.

According to the invention a filler is provided in the conveyor belt fastener 1 in the form of a molded body 11, which in the pressed-in or coupled condition fills the space in and between the eye lugs 7 as far as the end face 12 of the belting 3 except for a through opening 13 for the coupling rod, see FIGS. 2 and 3.

The molded body 11 has a backbone 14, extending for the full length of the conveyor belt strip of the fastener 1, with an abutment face 15 which in the assembled condition abuts the end face 12 of the belt end 2 (FIG. 2).

On the side opposite to the abutment face 15 the backbone 14 is fashioned with eye lug grooves 16 (see FIG. 1) and parallel fin elements 17 alternating with the grooves 16 (sectional in FIG. 2). These fin elements 17 are aligned with, or in the same plane as, the eye lugs 7 and for with the eye lugs respective annular bodies. The eye lug grooves 16 are each situated between a pair of fin elements 17 and form pockets. The lateral faces of adjacent fin elements 17 are the lateral faces of an eye lug groove 16. Furthermore, the fin elements 17 surround the through opening 13 for the coupling rod almost completely and are preferably so formed that they have crescent-shaped ends at the eye lug. The molded body 11 therefore more or less completely surrounds the coupling rod.

When the conveyor belt fastener strips 1 are located on the two ends 2 of a length 3 of conveyor belt in the coupled condition as in FIG. 3, the two molded bodies 11 only leave the passage opening 13 for the coupling rod free. All other spaces between the end faces 12 on the conveyor belt 3 and the eyes 6 are occupied and filled up by the two molded bodies 11, and the eye lugs 7 of the one conveyor belt fastener strip 1 are placed in the eye lug grooves 16 of the molded body 11 of the other conveyor belt fastener strip 1, and vice versa, so that due to the locking and adapted form of the lug 14 and of the fin elements 17 on the molded body 11 there is no free space between the two end faces 12 of the belt ends 2 which are coupled together.

Figure 4:
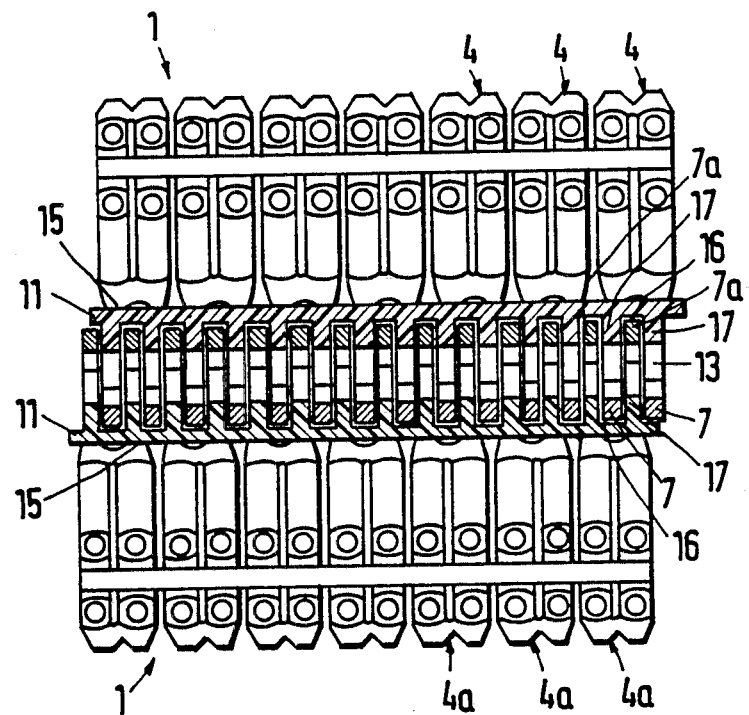
FIG. 4 shows a section taken along line IV/IV of FIG. 3 but without the conveyor belting.

FIG. 4 is a section taken along line IV-IV of FIG. 3 showing the position of the eye lugs 7 of the connection elements 4, and of the eye lugs 7a, respectively, of the connecting elements 4a in each case in the eye lug groove 16 between the fin elements 17 of the molded body 11 of the respective other conveyor belt fastener strip 1 and 1a, respectively. FIG. 4 shows that there is no longer any free space between the two outermost abutment faces 15 of the two moldings 11 apart from the through opening 13 for the coupling rod, such empty space otherwise being able to take up dust particles and other dirt which heretofore has interfered with the proper function of the coupling rod.

The molded body 11 is made of an elastic material so that it is able to be compressed and bent by the motion caused by the molded body rod. The molding 11 is preferably made of polyurethane and foam molded in situ; or it may be cast or injected directly adjacent to the eyes of the conveyor belt fastener strip 1 so that it forms an integral structure with the different connecting elements 4. The wire 5 is therefore not absolutely necessary inasfar as the molded body 11 is capable of holding together all the connecting elements 4 of a conveyor belt fastener strip 1.

The conveyor belt fastener strip 1 is preferably charged with grease in the factory producing the fastener by pressing grease into the eye lug grooves 16 where it remains until the fastener is used for joining two belt ends 2, at which time the eye lugs 7 of one conveyor belt fastener strip 1 force the grease out of the eye lug grooves of the other conveyor belt fastener strip 1, when they are moved into a joining position. The grease then becomes distributed even over the part with the eyes and is capable of lubricating the surfaces that slide on each other.

The fin elements 17 are arcuate as the eye lug grooves 16 and taper smoothly towards the eye lugs 7, as may be seen particularly clearly from FIGS. 1 and 2. In the assembled condition as shown in FIG. 2 the two tapering ends 18 and 19 of a fin element 17 are more or less opposite to each other at the apex of the eye lug 7.

Bridges 20 are provided between the eye lugs 7 and they are directly adjacent to the legs 8 and 9 of the connecting elements 4 and form the outer limits of the eye lug grooves 16. The bridges 20 serve to prevent loss of grease out of the eye lug grooves 16 and the access of dust or other dirt into the grooves 16 in an upward or downward direction.

The working example of the invention shown in FIG. 5 represents a modification of the belt fastener strip 1 of FIG. 1. The modification incudes a bead or a bead-like fin 21 on the abutment face 22, opposite to the eyes 6, of the molded body 23. The end face 24 on the belt end 25 is preferably made so as to be somewhat oblique in relation to the top face or lower face, respectively, see FIG. 5.

Except for the bead-like fin 21 the molded body 23 is quite the same as the molded body 11 of FIG. 1.

FIG. 6 illustrates a further molded body 26 in a conveyor belt fastener 27. The characteristic feature of the molded body 26 is the wedge-like recesses 28 in the fin elements 29. The wedge-like recesses 28 are preferably precisely in the center of the fin element 29 and are open towards the through opening 30. They extend from the lug 31 of the molded body 26 and close when the conveyor belt fastener 26 is forced into the conveyor belt 3.

Figure 7:
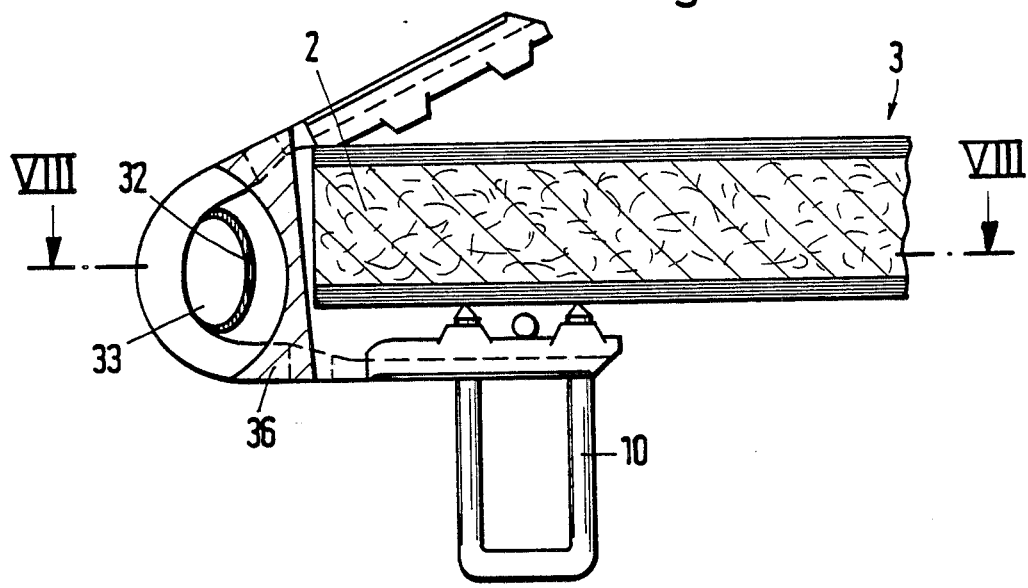
FIG. 7 is a section similar to that of FIGS. 1, 5 and 6 through a fourth embodiment of the present invention.
Figure 8:
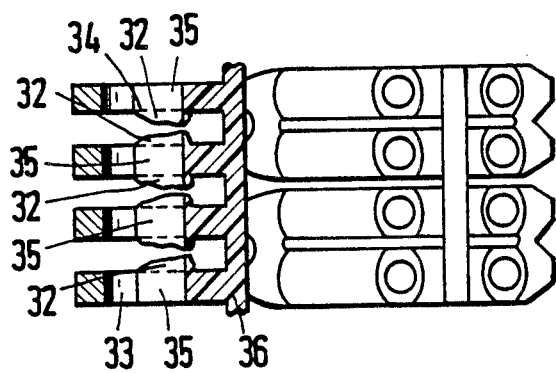
FIG. 8 sectional depicts a view taken along line VIII/VIII through two connecting elements of the belt fastener of FIG. 7.

In order to provide a further means for preventing access of dust into the through opening 30 for the coupling rod and to prevent the loss of grease from the through opening 30 to an even greater degree, in the working examples of the invention illustrated in FIGS. 7 and 8 there are sealing lips 32 on the edge 34, next to the through opening 30, of each fin element 35. The sealing lips 32 enhance the overall effect of the molded body 36.

The configurations of the molded bodies 11, 23, 26, and 36, respectively, change during fixing the fastener on the belt end 2 to a slight extent due to the compression. The initial form of the elastic material for the manufacture of the molded body is therefore to be selected so that the desired form will be guaranteed after such fixation.

What is claimed is:

1. A strip-like fastener for joining conveyor belt ends, comprising a plurality of connecting elements each having legs and eye lugs forming eyes, said elements extending in a row forming a strip extending parallel to said belt ends, said eyes accepting a coupling rod also extending transversely in relation to said belt ends, said connecting elements comprising means for securing said strip to said belt ends, at least one filler body of elastic material situated between said legs, said filler body comprising a molded body with eye lug receiving grooves between neighboring eye lugs and fins located in the planes defined by the respective eye lugs, said molded filler body being adapted to at least partly encompass said coupling rod and having a length corresponding to the full length of the conveyor belt fastener strip in the transverse direction of said belt, said molded filler body further having a backbone with an abutment face for abutting against a belt end.

2. The belt fastener as claimed in claim 1, wherein the eye lug grooves and the fin elements are arcuate in form.

3. The belt fastener as claimed in claim 1, wherein the fin elements jointly with the eye lugs of the connecting elements form annular structures extending away from said backbone.

4. The belt fastener as claimed in claim 1, wherein said abutment face of said backbone of the molded body has a bead-like rib (21) extending along the length of said backbone.

5. The belt fastener as claimed in claim 1, wherein said fin elements of the molded filler body have wedge-like recesses (28).

6. The belt fastener as claimed in claim 1, wherein said fin elements have sealing lips for limiting a through hole for said coupling rod.

7. The belt fastener as claimed in claim 6, wherein said sealing lips are formed on edges of said fin elements and extend towards each other from edges of adjacent fin elements.

8. The belt fastener as claimed in claim 1, wherein said molded filler body is made of a material selected from the group consisting of: injected resin foam, cast resin, and injection molded resin.

9. The belt fastener as claimed in claim 8, wherein said molded filler body is made of injected polyurethane foam.

10. The belt fastener as claimed in claim 1, wherein said eye lug grooves are filled with lubricating grease.

11. The belt fastener as claimed in claim 1, wherein said legs have holes therein for receiving said securing means, which are in the form of staples.

* * * * *